(12) United States Patent
Saito

(10) Patent No.: US 11,418,720 B2
(45) Date of Patent: Aug. 16, 2022

(54) APPARATUS, CONTROL METHOD, AND STORAGE MEDIUM

(71) Applicant: CANON KABUSHIKI KAISHA, Tokyo (JP)

(72) Inventor: Takao Saito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/177,002

(22) Filed: Feb. 16, 2021

(65) Prior Publication Data

US 2021/0266446 A1 Aug. 26, 2021

(30) Foreign Application Priority Data

Feb. 21, 2020 (JP) .............................. JP2020-028593

(51) Int. Cl.
*H04N 5/235* (2006.01)
(52) U.S. Cl.
CPC ......... *H04N 5/2353* (2013.01); *H04N 5/2351* (2013.01)
(58) Field of Classification Search
CPC ........................... H04N 5/2353; H04N 5/2351
See application file for complete search history.

(56) References Cited

U.S. PATENT DOCUMENTS

2011/0261225 A1* 10/2011 Niinami .................. G06T 7/248
348/223.1
2020/0084361 A1* 3/2020 Xu ........................ G05D 1/0088

FOREIGN PATENT DOCUMENTS

JP 2006254364 A * 9/2006
JP 2010136205 A 6/2010

* cited by examiner

*Primary Examiner* — Ahmed A Berhan
(74) *Attorney, Agent, or Firm* — Canon U.S.A., Inc. IP Division

(57) ABSTRACT

An apparatus includes an imaging unit configured to capture an image with an exposure time determined for each pixel or for each area including a plurality of pixels, a detection unit configured to detect a moving object area from the captured image, a calculation unit configured to calculate a luminance of each of a plurality of the pixels or the areas that is included in the detected moving object area, and a determination unit configured to determine, for each of the plurality of pixels or areas included in the moving object area, a different exposure time in a predetermined range based on the calculated luminance.

15 Claims, 13 Drawing Sheets

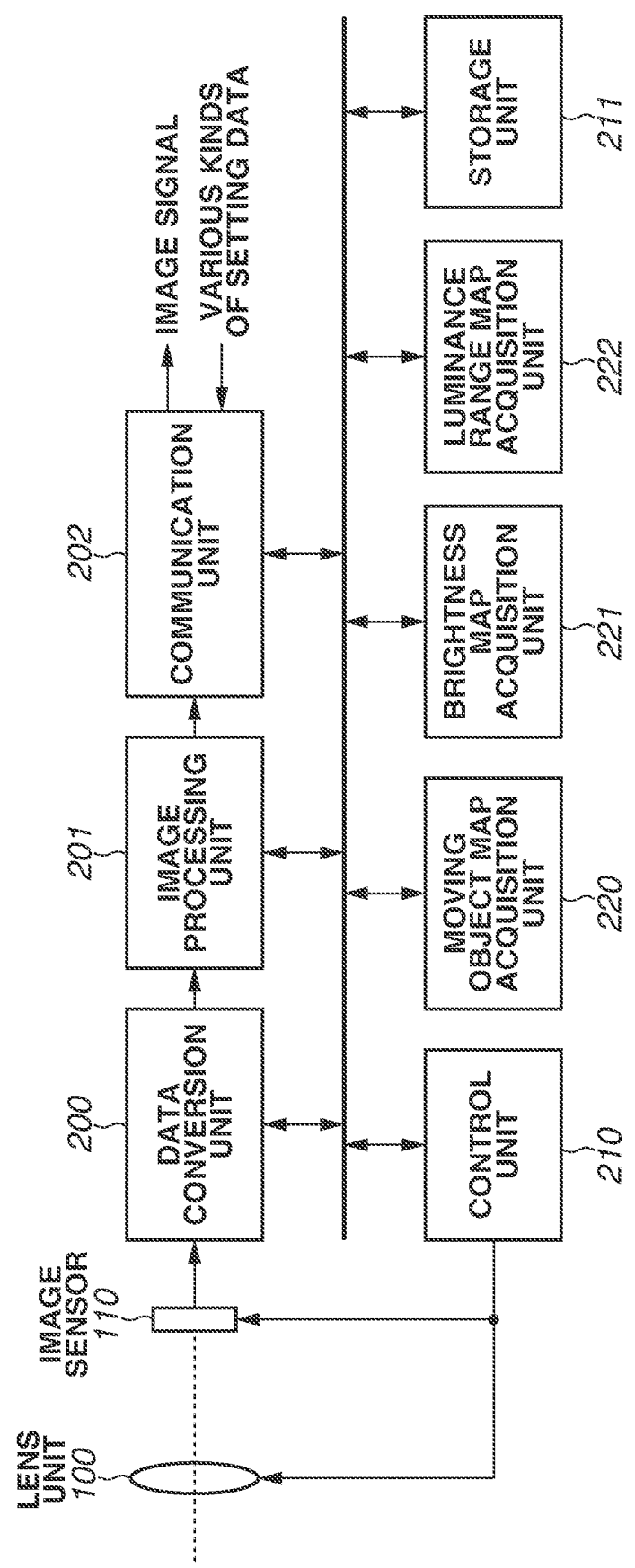

FIG.2A
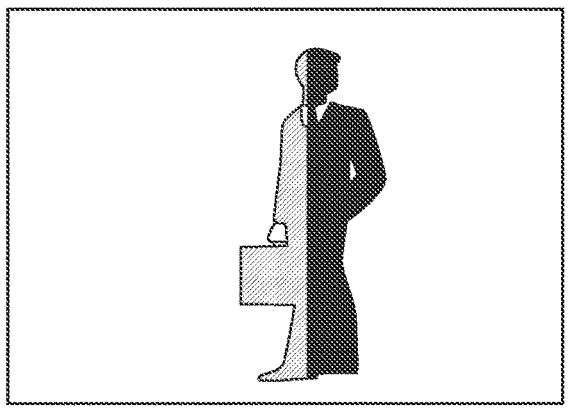
FIG.2B
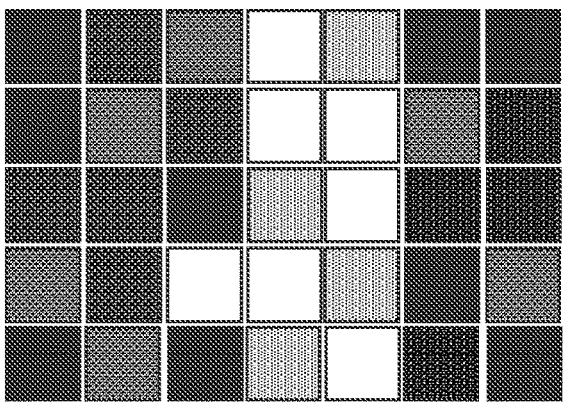
FIG.2C
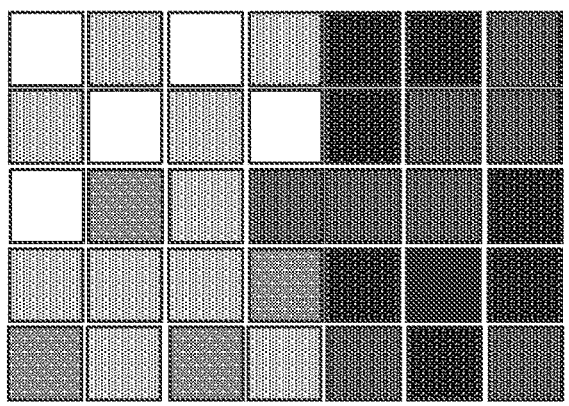
FIG.2D
| | | | -0.5 | -2 | | |
|---|---|---|---|---|---|---|
| | | | 0 | -2 | | |
| | | | -1.5 | -1.5 | | |
| | | -0.5 | -1 | -2 | | |
| | | | -0.5 | -1.5 | | |

FIG.5A

| VALUE IN LUMINANCE RANGE MAP | -1 | -1.5 | -2 | -2.5 |
|---|---|---|---|---|
| CORRECTION VALUE FOR EXPOSURE TIME | -0.75 | -1 | -1.25 | -1.5 |

FIG.5B

| VALUE IN LUMINANCE RANGE MAP | -1 | -1.5 | -2 | -2.5 |
|---|---|---|---|---|
| CORRECTION VALUE FOR EXPOSURE TIME | -0.9 | -1.35 | -1.8 | -2.25 |

FIG.5C

| VALUE IN LUMINANCE RANGE MAP | -1 | -1.5 | -2 | -2.5 |
|---|---|---|---|---|
| CORRECTION VALUE FOR EXPOSURE TIME | -0.6 | -0.9 | -1.2 | -1.5 |

FIG.6A

| 0 | +0.5 | 0 | +0.5 | +2 | +2 | +1.5 |
|---|---|---|---|---|---|---|
| +0.5 | 0 | +0.5 | 0 | +2 | +1.5 | +1.5 |
| 0 | +1 | +0.5 | +1.5 | +1.5 | +1.5 | +2 |
| +0.5 | +0.5 | +0.5 | +1 | +2 | +2.5 | +2 |
| +1 | +0.5 | +1 | +0.5 | +1.5 | +2 | +1.5 |

FIG.6B

| | | | −0.5 | −1.25 | | |
|---|---|---|---|---|---|---|
| | | | 0 | −1.25 | | |
| | | | −1 | −1 | | |
| | | −0.5 | −0.75 | −1.25 | | |
| | | | −0.5 | −1 | | |

FIG.6C

| | | | 0 | +0.75 | | |
|---|---|---|---|---|---|---|
| | | | 0 | +0.75 | | |
| | | | +0.5 | +0.5 | | |
| | | 0 | +0.25 | +0.75 | | |
| | | | 0 | +0.5 | | |

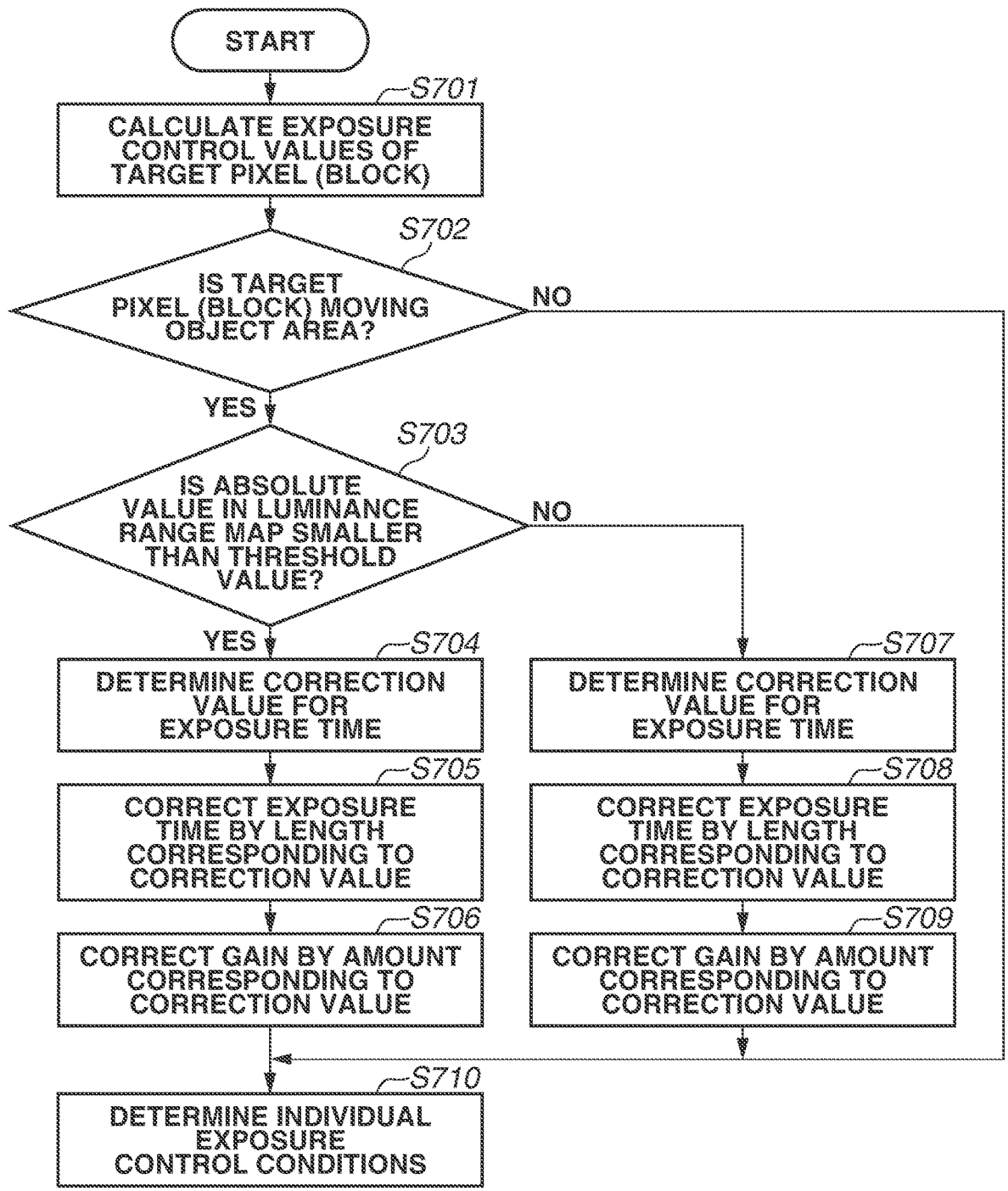

FIG.8

| VALUE IN LUMINANCE RANGE MAP | 0 | 0.25 | 0.5 | 0.75 |
|---|---|---|---|---|
| CORRECTION VALUE FOR EXPOSURE TIME | 0 | 0 | 0.25 | 0.25 |

FIG.12

| MOVING OBJECT SPEED (FRAMES PER PIXEL) | 5 | 10 | 15 | 20 |
|---|---|---|---|---|
| UPPER LIMIT EXPOSURE TIME | 1/30 | 1/60 | 1/90 | 1/120 | ns
APPARATUS, CONTROL METHOD, AND STORAGE MEDIUM

BACKGROUND

Field of the Disclosure

The present disclosure relates to an apparatus, a control method, and a storage medium.

Description of the Related Art

Conventionally, there has been known a technique for appropriately capturing an image by controlling the exposure time of each pixel even when the luminance range of a subject is wide, as discussed in Japanese Patent Application Laid-Open No. 2010-136205.

SUMMARY

According to an aspect of the embodiments, an apparatus includes an imaging unit configured to capture an image with an exposure time determined for each pixel or for each area including a plurality of pixels, a detection unit configured to detect a moving object area from the captured image, a calculation unit configured to calculate a luminance of each of a plurality of the pixels or the areas that is included in the detected moving object area, and a determination unit configured to determine, for each of the plurality of pixels or areas included in the moving object area, a different exposure time in a predetermined range based on the calculated luminance.

Further features of the present disclosure will become apparent from the following description of exemplary embodiments with reference to the attached drawings.

BRIEF DESCRIPTION OF THE DRAWINGS

FIG. 1 is a block diagram illustrating the functional configuration of an imaging apparatus according to a first exemplary embodiment of the present disclosure.

FIG. 2A is a diagram illustrating a captured image. FIGS. 2B to 2D are diagrams each illustrating a map according to the first exemplary embodiment.

FIGS. 5A to 5C are diagrams each illustrating an example of a conversion table for an exposure time correction value according to the first exemplary embodiment.

FIGS. 6A to 6C are diagrams illustrating examples of exposure time values before and after correction according to the first exemplary embodiment.

FIG. 7 is a flowchart illustrating processing for controlling the exposure of the image sensor according to a second exemplary embodiment.

FIG. 8 is a diagram illustrating an example of a conversion table for an exposure time correction value according to the second exemplary embodiment.

FIG. 12 is a correspondence table between an appropriate exposure time and a moving object speed according to the third exemplary embodiment.

DESCRIPTION OF THE EMBODIMENTS

Figure 3:
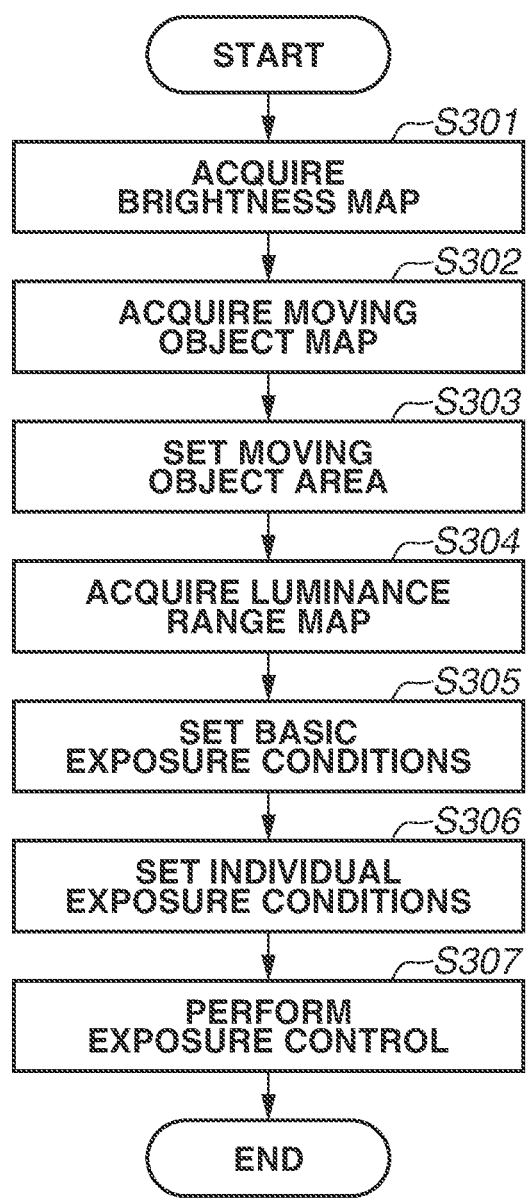
FIG. 3 is a flowchart illustrating an exposure control operation performed by the imaging apparatus according to the first exemplary embodiment.

FIG. 1 illustrates the functional configuration of an imaging apparatus according to a first exemplary embodiment of the present disclosure. A subject image acquired via a lens unit 100 is converted into an electric signal (pixel signal) by an image sensor 110. The lens unit 100 includes, for example, a zoom lens, a focus lens, and a diaphragm. The image sensor 110 can capture an image while controlling exposure conditions such as an exposure time and a gain on a pixel-by-pixel basis or an area-by-area (block-by-block) basis. Thus, the image sensor 110 is suitable for acquiring an image having a wide dynamic range. In the present exemplary embodiment, an example will be described in which the entire imaging area is divided into a plurality of blocks and the exposure time is controlled on a block-by-block basis. The acquired pixel signal is converted into a format suitable for image processing by a data conversion unit 200. Examples of the data conversion include an analog-to-digital (A/D) conversion and demosaic processing. The pixel signal is then subjected to correction processing and development processing and converted into an image signal by an image processing unit 201. The processing by the image processing unit 201 may include data compression processing such as Joint Photographic Experts Group (JPEG) compression. The acquired image signal is output by a communication unit 202 as image data via an external interface. All the processes performed by the above-described components are controlled by a control unit 210, and the results are stored in a storage unit 211 as necessary. In addition, each of the components can be controlled using a program and data stored in the storage unit 211.

The imaging apparatus according to the present exemplary embodiment further includes a moving object map acquisition unit 220, a brightness map acquisition unit 221, and a luminance range map acquisition unit 222.

When the subject to be captured by the image sensor 110 is moving, the moving object map acquisition unit 220 detects the subject as a moving object and acquires a moving object map. The moving object map acquisition unit 220 generates motion information by, for example, acquiring luminance information from chronologically-acquired pixel signals and then calculating an average of absolute values of luminance changes of a plurality of pixels. If the average luminance change value is equal to or greater than a threshold value, the moving object map acquisition unit 220 generates motion information while determining all the plurality of pixels used to calculate the average value as an area (block) in which a motion occurs. Conversely, if the average luminance change value is smaller than the threshold old value, the moving object map acquisition unit 220 generates motion information while determining the pixels as an area (block) in which no motion occurs. The moving object map acquisition unit 220 associates the motion information generated in this manner with each pixel, thereby storing the information as a moving object map. By referring to the moving object map, a moving object area can be recognized. The method for acquiring the moving object map is not limited thereto. The moving object map may be acquired by another method. The motion information may be generated based on the calculation on a pixel-by-pixel basis.

The brightness map acquisition unit 221 acquires brightness information (brightness map) of the subject based on the luminance information acquired from the pixel signals and exposure conditions set in the image sensor 110. The brightness map acquisition unit 221 generates and holds the brightness map of the image based on, for example, the luminance information averaged among the plurality of pixels and the exposure conditions.

The luminance range map acquisition unit 222 calculates the range of brightness (luminance) of the moving object (i.e., the luminance range) based on the moving object map acquired by the moving object map acquisition unit 220 and the brightness map acquired by the brightness map acquisition unit 221. The luminance range map acquisition unit 222, for example, uses the brightness map to obtain the brightness information of the pixels recognized as the moving object area based on the moving object map, and stores a difference between the upper limit value and the value of each of the pixels in the moving object area in the brightness map as a map in association with the pixel. The luminance range may be acquired using not only the above-described method but also another method. The luminance range map may be added to the moving object map or the brightness map as additional information.

The moving object map acquisition unit 220, the brightness map acquisition unit 221, and the luminance range map acquisition unit 222 are controlled by the control unit 210, and the respective acquired results are stored in the storage unit 211.

Next, the moving object map, the brightness map, and the luminance range map according to the present exemplary embodiment will be described with reference to FIGS. 2A to 2D.

FIG. 2A illustrates an example of the captured image, and indicates a state where one side (left side) of the moving object is brightly illuminated. The subject is illustrated for simplification in this example, but the moving object map and the brightness map are generated with a background included therein.

FIG. 2B illustrates an example of the moving object map. In FIG. 2B, pixels having higher values are whiter, which indicates that an area including the pixels is likely to include a moving object. Compared to the captured image, the moving object map includes rough information in terms of both resolution and tone.

FIG. 2C illustrates an example of the brightness map. Similarly to FIG. 2B, in FIG. 2C, pixels having higher values are whiter, which indicates that the subject and the background are bright. Similarly to the moving object map, the brightness map includes rough information in terms of both resolution and tone, compared to the captured image.

FIG. 2D illustrates an example of the luminance range map. The luminance range map associates the moving object area in the moving object map with the brightness map, and indicates brightness relative to the brightest area (block) in the moving object area in the form of a logarithm to base 2. For example, for an area that is half as bright as the brightest area, −1 is set as the value in the luminance range map. More specifically, the luminance range map indicates the brightness of each block as an exposure value (EV) based on the brightest block. In FIG. 2D, an area with "0" indicates the brightest area in the moving object area, and an area with "−2" indicates that the brightness is lower by 2EV than the brightest area (block) in the moving object area. The value of each area (block) in the luminance range map is calculated by the following equation 1.

$$C = \log_2 \frac{B}{A}$$

In this equation, C, A, and B represent the value of each area (block) in the luminance range map, the luminance value of the brightest block in the moving object area, and the luminance value of the target block, respectively. For example, if the luminance value A of the brightest block in the moving object area is 100 and the luminance value B of the target block is 25, the value C in the luminance range map is calculated to be −2.

The luminance range may be expressed based on the brightest area in this manner, or may be expressed based on the darkest area. The luminance range may be expressed based on any other brightness level. In FIG. 2D, an area with no luminance range displayed therein indicates that the area is not a moving object area, but a fixed value indicating that the area is not a moving object area (e.g., +1) may be input therein.

In the present exemplary embodiment, the example has been described in which the value of each block in the luminance range map is calculated as the EV representing the brightness, but the luminance range map is not limited thereto. A method other than the method using the EV may be used as long as the luminance range map can indicate the luminance range (distribution) in the moving object area.

Next, an operation flow of the imaging apparatus according to the present exemplary embodiment will be described with reference to FIG. 3. FIG. 3 is a flowchart illustrating an exposure control operation performed by the imaging apparatus according to the present exemplary embodiment. Each step in FIG. 3 is mainly performed by the control unit 210.

First, in step S301, the control unit 210 acquires the brightness map of the subject using the brightness map acquisition unit 221.

Then, in step S302, the control unit 210 acquires the moving object map of the subject using the moving object map acquisition unit 220.

In step S303, the control unit 210 extracts, from the moving object map, an area where the motion amount (luminance value change amount) is equal to or greater than a predetermined value, and sets the area as a moving object area. The acquired moving object area is passed to the next step (step S304), but may be stored in the storage unit 211 as a moving object area map.

In step S304, the control unit 210 calculates the luminance range of the moving object area set in step S303 by using the luminance range map acquisition unit 222, thereby acquiring the luminance range map.

In step S305, the control unit 210 determines basic exposure conditions of the lens unit 100 and the image sensor 110 by using the brightness map acquired in step S301. The basic exposure conditions are determined as the setting values of the exposure time, the gain, the aperture value, and the like based on, for example, the average of all the values in the brightness map. Alternatively, the basic exposure conditions may be determined by another method.

In step S306, the control unit 210 determines individual exposure conditions of each pixel based on the brightness map, the moving object map, and the luminance range map acquired in steps S301 to S304. The individual exposure conditions are the setting values of, for example, the exposure time and the gain set for each pixel of the image sensor 110. The details of this step will be described below.

In step S307, the control unit 210 performs control based on the basic exposure conditions determined in step S305 and the individual exposure conditions determined in step S306, thereby acquiring the image data of the subject.

As describe above, the exposure control operation is performed by the imaging apparatus according to the present exemplary embodiment.

Next, the method for setting the individual exposure conditions of each pixel in step S306 of FIG. 3 will be described in detail with reference to FIG. 4.

Figure 4:
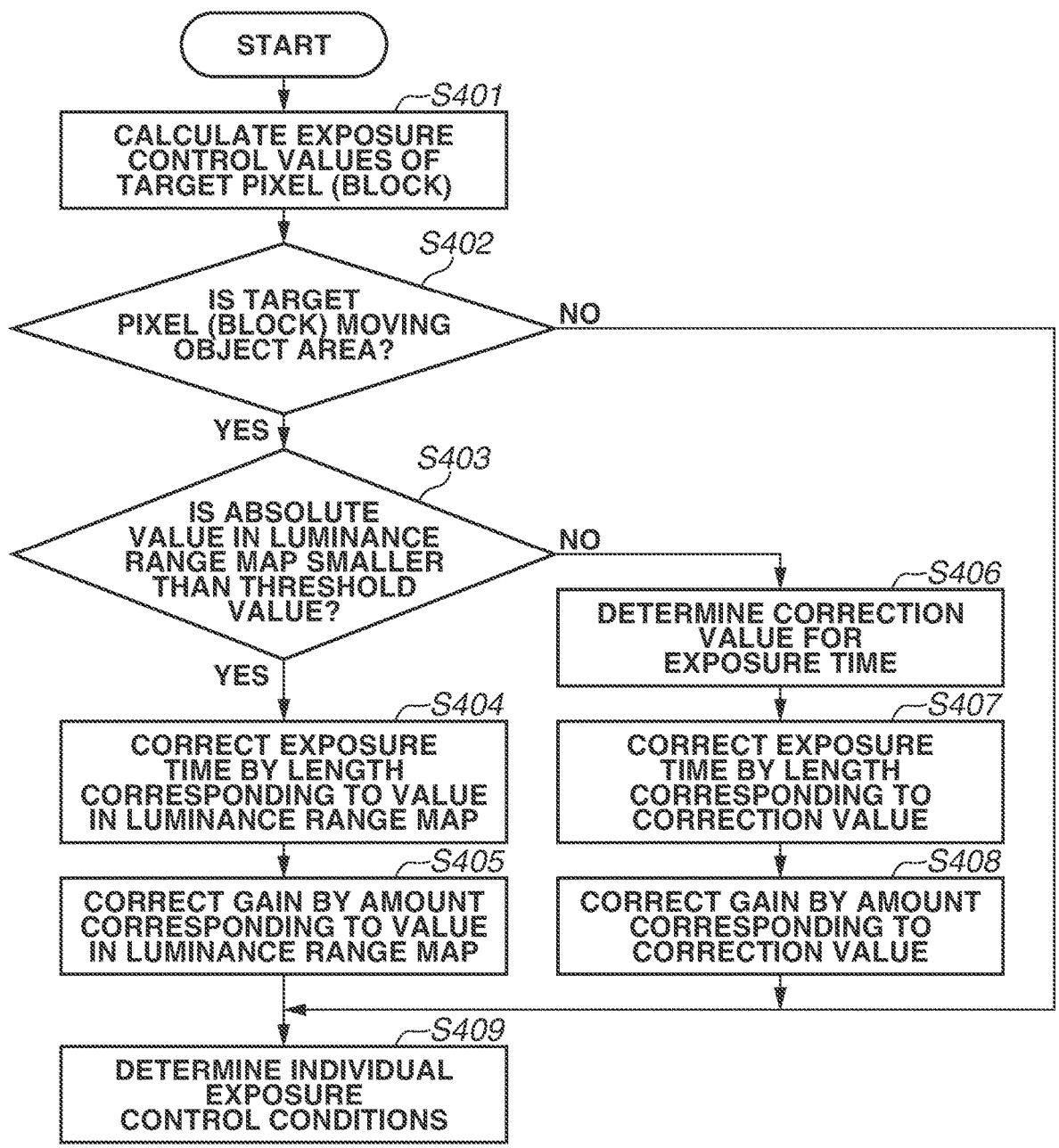
FIG. 4 is a flowchart illustrating processing for controlling the exposure of an image sensor according to the first exemplary embodiment.

FIG. 4 is a flowchart illustrating exposure setting processing for each pixel of the image sensor 110 of the imaging apparatus according to the present exemplary embodiment. The processing in this flowchart is performed by the control unit 210, and is repeated for all the pixels.

First, in step S401, the control unit 210 calculates exposure control values of the target pixel, more specifically the gain and the exposure time, based on the value in the brightness map. Through this calculation, the gain and the exposure time leading to an appropriate exposure amount with respect to the value in the brightness map are determined.

Then, in step S402, the control unit 210 determines whether the target pixel is a moving object area. When making the determination, the control unit 210 may read out the moving object area map from the storage unit 211, or may read out the luminance range map to determine whether the target pixel is a moving object area based on the value therein. If the target pixel is a moving object area (YES in step S402), the processing proceeds to step S403. If the target pixel is not a moving object area (NO in step S402), the processing proceeds to step S409.

In step S403, the control unit 210 reads out the value in the luminance range map, and determines whether the absolute value thereof (EV or brightness) is smaller than a threshold value. It is assumed that, for example, "1" (1EV) is set as the threshold value and is stored in the storage unit 211. If the absolute value in the luminance range map is smaller than the threshold value (YES in step S403), the processing proceeds to step S404. If the absolute value (EV or brightness) in the luminance range map is equal to or greater than the threshold value (NO in step S403), the processing proceeds to step S406.

In step S404, the control unit 210 reads out the value in the luminance range map, and uses the read-out value (EV) as an exposure time correction value to recalculate the exposure time so that the exposure time is reduced by a length corresponding to the value. As a result, the same exposure time is set for each of the moving object areas where the absolute value in the luminance range map is smaller than the threshold value (i.e., the luminance range is narrow). This can prevent the generation of a noticeably blurred image due to an excessively long exposure time.

In step S405, the control unit 210 recalculates the value of the gain so that the value is increased by an amount corresponding to the value in the luminance range map, i.e., by an amount corresponding to the reduction in the exposure time. Accordingly, the exposure amount can be appropriately controlled for the moving object area darkened by the amount corresponding to the change in the exposure time in step S404. After that, the processing proceeds to step S409.

On the other hand, in step S406, the control unit 210 reads out the value in the luminance range map, and determines an exposure time correction value based on the read-out value. Step S406 is different from step S404 in that the exposure time correction value is determined based on the value in the luminance range map in step S406 while the value in the luminance range map is directly used as the exposure time correction value in step S404. The exposure time correction value determined in step S406 has an absolute value smaller than the value in the luminance range map. For example, if the value in the luminance range map is −2, the exposure time correction value is −1.25.

FIGS. 5A to 5C each illustrate a relationship between the value in the luminance range map and the exposure time correction value.

The value in the luminance range map and the exposure time correction value may be stored in the storage unit 211 as a table such as the example illustrated in FIG. 5A. The relationship may be such that the exposure time correction value increases as the value in the luminance range map increases, or may be such that the exposure time correction value is fixed regardless of the value in the luminance range map. Alternatively, these may be combined.

While the present exemplary embodiment aims to fulfill both the reduction of variation in the amount of blur and the securement of a wide dynamic range, there may be a case where one of the reduction and the securement is prioritized by the user. In this case, such prioritization can be achieved by switching between the threshold value in the above-described step S403 and the table of FIG. 5A in step S406 based on the user's selection.

More specifically, if the priority is placed on the reduction of variation in the amount of blur, the threshold value can be set to a greater value such as 3. The variation in the amount of blur in the moving object area can also be reduced by setting the correction value to a greater value as illustrated in the table of FIG. 5B.

Conversely, if the priority is placed on the securement of a wide dynamic range, the threshold value can be set to a smaller value such as 1. The dynamic range of the moving object area can also be widened by setting the correction value to a smaller value as illustrated in the table of FIG. 5C.

Referring back to FIG. 4, in step S407, the control unit 210 recalculates the exposure time using the exposure time correction value determined in step S406. Accordingly, the exposure time set for the moving object area where the absolute value in the luminance range map is equal to or greater than the threshold value is set in a narrower range than the value set in step S401. As a result, the imaging apparatus can reduce the amount of blur in the moving object area while securing a wide dynamic range.

In step S408, the control unit 210 recalculates the value of the gain so that the value is increased by an amount corresponding to the exposure time correction value determined in step S406. Because the correction of the exposure time reduces the exposure time and makes the image darker, the control unit 210 compensates for this by increasing the signal gain. Accordingly, the exposure amount can be appropriately controlled for the moving object area of which the exposure amount is changed by the amount corresponding to the change in the exposure time in step S407. After that, the processing proceeds to step S409.

In step S409, the control unit 210 determines the calculated exposure control values of the pixel as the individual exposure conditions.

By performing the above-described operation for each of the blocks, the individual exposure control conditions are determined for all the blocks. In the present exemplary embodiment, the example has been described in which the exposure conditions are determined on a block-by-block basis, but the exposure conditions may be determined on a pixel-by-pixel basis or an area-by-area basis.

FIGS. 6A to 6C illustrate exposure times before and after the exposure setting processing illustrated in FIG. 4. FIG. 6A illustrates the exposure times (EVs) calculated in step S401 of FIG. 4. The area surrounded by a thick line indicates a moving object area. FIG. 6B illustrates the exposure time (EV) correction values determined in step S404 or S406 of in FIG. 4. FIG. 6C illustrates the exposure times (EVs) of the moving object area corrected in step S404 or S407. The corrected exposure time (EV) of each of the blocks in FIG. 6C corresponds to the sum of the exposure time (EV) of the block in FIG. 6A and the correction value for the block in FIG. 6B. The exposure times (EVs) of the blocks other than the moving object area are not illustrated in FIG. 6C, but actually, the exposure times (EVs) are determined for all the blocks including the blocks other than the moving object area.

In addition, in the moving object area, for each block where the absolute value in the luminance range map is smaller than the threshold value of 1, the same exposure time (EV) as that of the brightest area is set. For each block where the value in the luminance range map is equal to or greater than the threshold value, the same exposure time is not set, but the exposure time is set in a narrow range compared to the exposure time in step S401 (in FIG. 6A). The dynamic range is somewhat affected due to the narrowed distribution of the exposure times, but the exposure times are shortened and thus the amount of blur can be reduced. Although the dynamic range is somewhat affected, a sufficiently wide dynamic range can be still secured compared to when the exposure times are uniformly fixed.

With respect to a moving object having a large luminance difference, the imaging apparatus performs the above-described exposure control operation, thereby making it possible to capture an image having a wide dynamic range while reducing the variation in the amount of blur in the moving object area.

Next, an operation flow of an imaging apparatus according to a second exemplary embodiment of the present disclosure will be described with reference to FIG. 7. In the present exemplary embodiment, the method for determining the individual exposure conditions of each pixel is different from that in the first exemplary embodiment. In the present exemplary embodiment, for each pixel (or block) where the absolute value in the luminance range map is smaller than the threshold value, the same exposure time is not necessarily set and the range of the exposure time is narrowed. The present exemplary embodiment will be described mainly focusing on the differences.

FIG. 7 is a flowchart illustrating exposure setting processing for each pixel (or block) of the image sensor 110 of the imaging apparatus according to the present exemplary embodiment. The processing in this flowchart is performed by the control unit 210, and is repeated for all the pixels (or blocks).

First, in steps S701 to S703, control is performed similarly to steps S401 to S403 according to the first exemplary embodiment.

In step S704, the control unit 210 reads out the value in the luminance range map, and determines an exposure time correction value based on the read-out value. At this time, the exposure time correction value is equal to or greater than zero and smaller than the value (absolute value) in the luminance range map. For example, if the value (absolute value) in the luminance range map is 0.5 EV, the exposure time correction value (absolute value) is 0.25 EV.

The value (absolute value) in the luminance range map and the exposure time correction value (absolute value) may be stored in the storage unit 211 as a table such as the example illustrated in FIG. 8. The relationship may be such that the exposure time correction value increases as the value in the luminance range map increases, or may be such that the exposure time correction value is fixed regardless of the value in the luminance range map. Alternatively, these may be combined.

Then, in step S705, the control unit 210 uses the exposure time correction value determined in step S704 to recalculate the exposure time so that the exposure time is reduced by a length corresponding to the correction value. Accordingly, the exposure time set for the moving object area where the absolute value in the luminance range map is smaller than the threshold value is set in a narrower range than the value set in step S701.

In step S706, the control unit 210 recalculates the value of the gain so that the value is increased by an amount corresponding to the exposure time correction value determined in step S704. Accordingly, the exposure amount can be appropriately controlled for the moving object area of which the exposure amount is changed by the amount corresponding to the change in the exposure time in step S705. After that, the processing proceeds to step S710.

In steps S707 to S710, control is performed similarly to steps S406 to S409 according to the first exemplary embodiment.

With respect to a moving object having a large luminance difference, the imaging apparatus performs the above-described exposure control operation, thereby making it possible to capture an image having a wide dynamic range while reducing the variation in the amount of blur.

Figure 9:
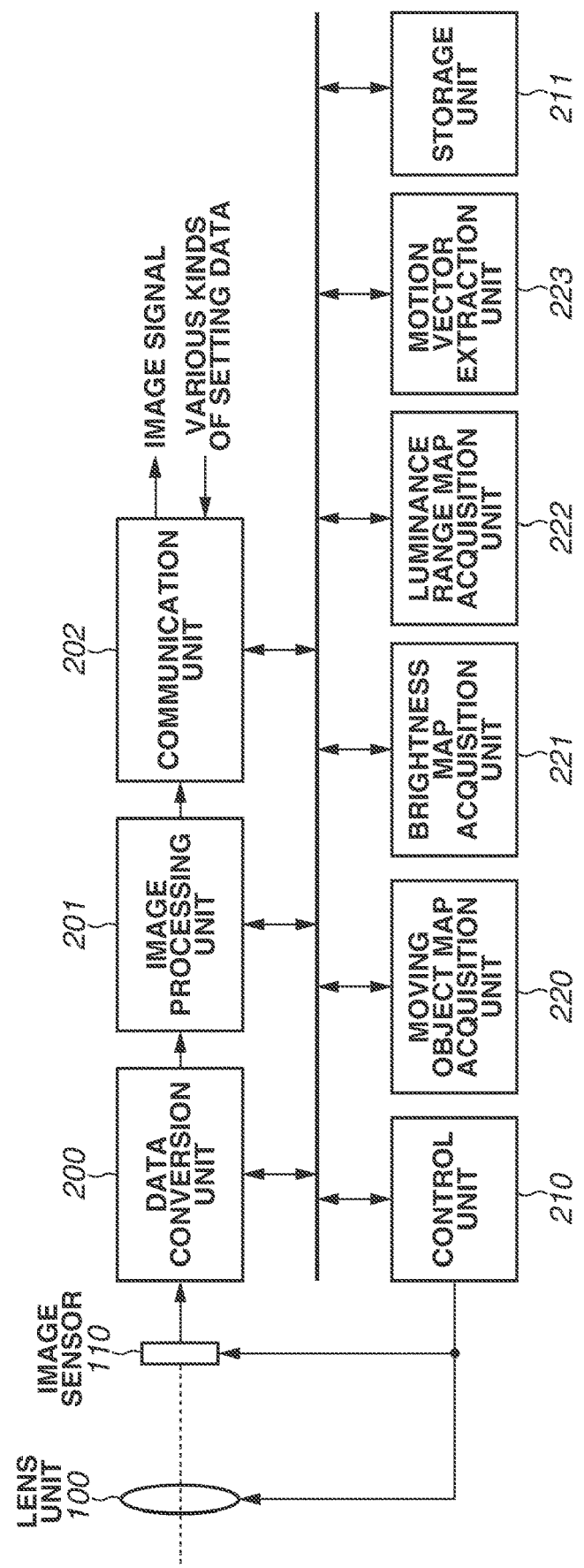
FIG. 9 is a block diagram illustrating the functional configuration of an imaging apparatus according to a third exemplary embodiment.

Next, an operation flow of an imaging apparatus according to a third exemplary embodiment of the present disclosure will be described with reference to FIG. 9. The present exemplary embodiment is different from the above-described exemplary embodiments in that the speed of the moving object can be further determined.

In the present exemplary embodiment, the imaging apparatus further includes a motion vector extraction unit 223. More specifically, the control unit 210 causes the motion vector extraction unit 223 to extract a temporal change in the brightness map as a motion vector, thereby determining the speed of the moving object on the screen based on the motion vector magnitude. The moving object speed may be detected by another method. Because the blur amount increases as the moving object speed increases, change of the exposure time based on the speed can reduce the subject's blur itself.

Figure 10:
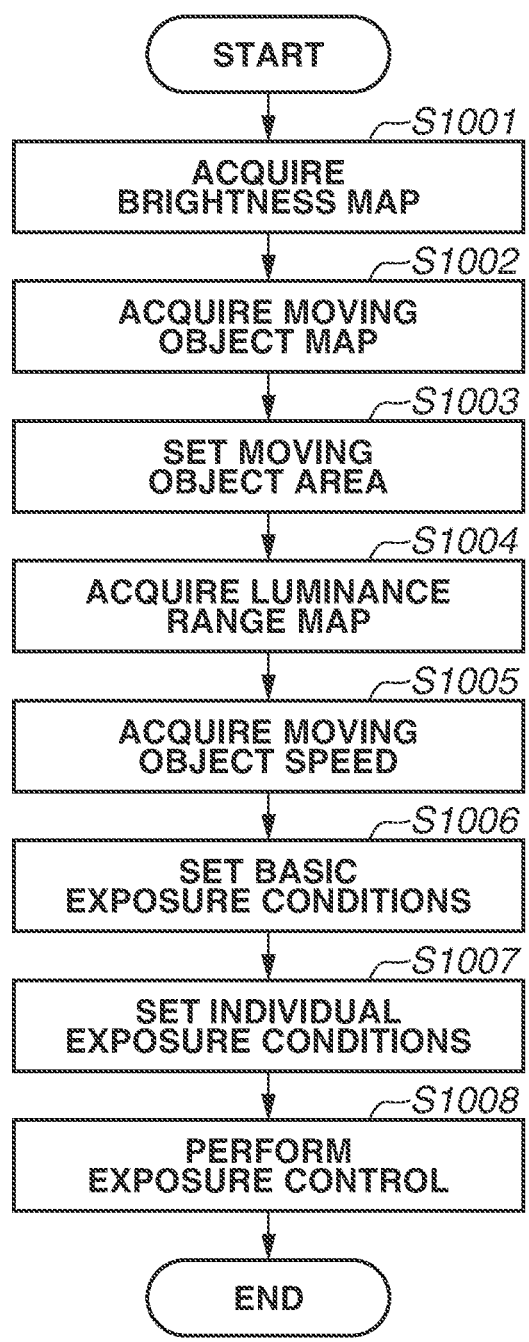
FIG. 10 is a flowchart illustrating an exposure control operation performed by the imaging apparatus according to the third exemplary embodiment.

FIG. 10 is a flowchart illustrating an exposure control operation performed by the imaging apparatus according to the present exemplary embodiment. Each step in FIG. 10 is mainly performed by the control unit 210. In the present exemplary embodiment, the differences from the first and second exemplary embodiments will be mainly described.

First, in steps S1001 to S1004, an operation is performed similarly to steps S301 to S304 according to the first exemplary embodiment.

Then, in step S1005, the control unit 210 calculates (detects) the speed of the moving object in the moving object area set in step S1003 by extracting the motion vectors based on the values in the brightness map and then calculating an average magnitude of the motion vectors. The acquired moving object speed is stored in the storage unit 211.

In step S1006, an operation is performed similarly to step S305 according to the first exemplary embodiment.

In step S1007, the control unit 210 determines the individual exposure conditions of each pixel based on the brightness map, the moving object map, the luminance range map, and the moving object speed acquired in steps S1001 to S1005. The individual exposure conditions are the setting values of, for example, the exposure time and the gain set for each pixel of the image sensor 110. The details of this step will be described below.

In step S1008, the control unit 210 performs an operation similarly to step S307 according to the first exemplary embodiment.

As described above, the exposure control operation is performed by the imaging apparatus according to the present exemplary embodiment.

Next, the method for setting the individual exposure conditions of each pixel in step S1007 of FIG. 10 will be described in detail with reference to FIG. 11.

Figure 11:
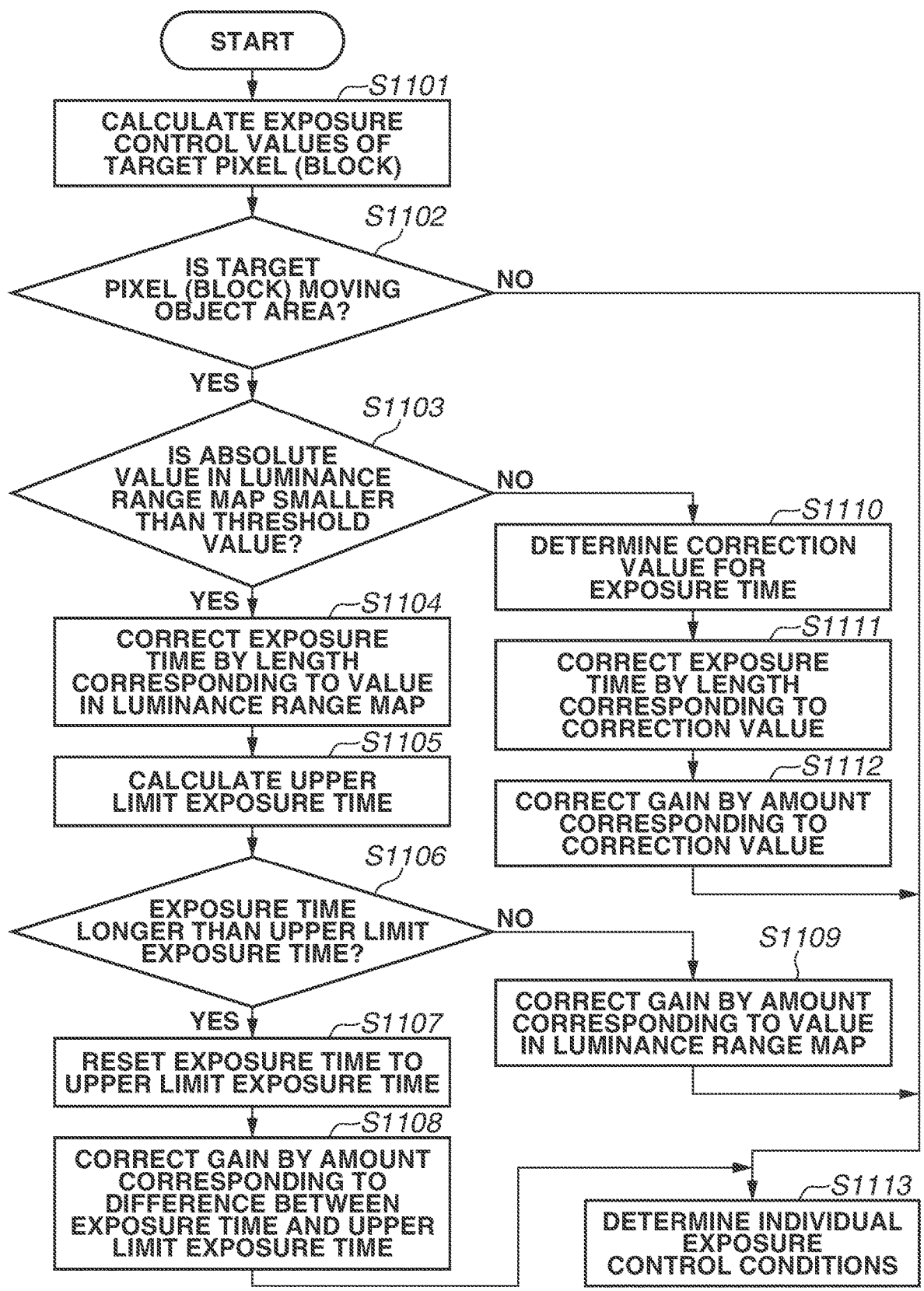
FIG. 11 is a flowchart illustrating processing for controlling the exposure of the image sensor according to the third exemplary embodiment.

FIG. 11 is a flowchart illustrating exposure setting processing for each pixel of the image sensor 110 of the imaging apparatus according to the present exemplary embodiment. The processing in this flowchart is performed by the control unit 210, and is repeated for all the pixels.

First, in steps S1101 to S1104, an operation is performed similarly to steps S401 to S404 according to the first exemplary embodiment.

In step S1105, the control unit 210 reads out the moving object speed, and calculates an appropriate exposure time based on the speed as an upper limit exposure time. The upper limit exposure time is set so as to prevent the user from having a strange feeling about the image due to the blur amount of the subject. The relationship between the moving object speed and the upper limit exposure time may be stored in the storage unit 211 as a table such as the example illustrated in FIG. 12. More specifically, because the image is more likely to be blurred as the moving speed of the moving object increases, the upper limit of the exposure time is decreased with an increase in the moving speed of the moving object.

In step S1106, the control unit 210 compares the exposure time acquired in step S1104 with the upper limit exposure time acquired in step S1105. If the exposure time is longer than the upper limit exposure time (YES in step S1106), the processing proceeds to step S1107. If the exposure time is equal to or shorter than the upper limit exposure time (NO in step S1106), the processing proceeds to step S1109.

In step S1107, the control unit 210 resets the exposure time to the upper limit exposure time. In addition, the control unit 210 stores the difference between the exposure time and the upper limit exposure time. Accordingly, based on the moving speed of the moving object, the exposure time can be set so as to prevent the user from having a strange feeling about the image.

In step S1108, the control unit 210 recalculates the value of the gain so that the value is increased by an amount corresponding to the difference stored in step S1107. Accordingly, the exposure amount can be appropriately controlled for the moving object area of which the exposure amount is changed by the amount corresponding to the change in the exposure time in step S1107. After that, the processing proceeds to step S1112.

In step S1109, an operation is performed similarly to step S405 according to the first exemplary embodiment. After that, the processing proceeds to step S1113.

In steps S1110 to S1112, an operation is performed similarly to steps S406 to S408 according to the first exemplary embodiment.

In step S1113, the control unit 210 determines the calculated exposure control values of the pixel as the individual exposure conditions.

With respect to a moving object having a large luminance difference (e.g., a car running with the headlight on), the imaging apparatus performs the above-described exposure control operation, thereby setting an appropriate exposure time based on the moving speed so as to reduce the amount of blur. Furthermore, the exposure control operation makes it possible to capture an image having a wide dynamic range while reducing the blur amount variation in each part of the moving object area.

In the above-described exemplary embodiments, the examples have been described in which the exposure conditions are determined on a pixel-by-pixel basis or a block-by-block basis, but the exposure conditions may be determined on an area-by-area basis.

The control according to the above-described exemplary embodiments of the present disclosure may be partially or entirely implemented by supplying a program (software) for implementing the functions according to the above-described exemplary embodiments to an imaging apparatus or an information processing apparatus via a network or various kinds of storage media, and then causing a computer (e.g., a central processing unit (CPU), a micro processing unit (MPU)) in the imaging apparatus or information processing apparatus to read out and execute the program. In this case, the program and the storage medium storing the program shall constitute the exemplary embodiments of the present disclosure.

Figure 13:
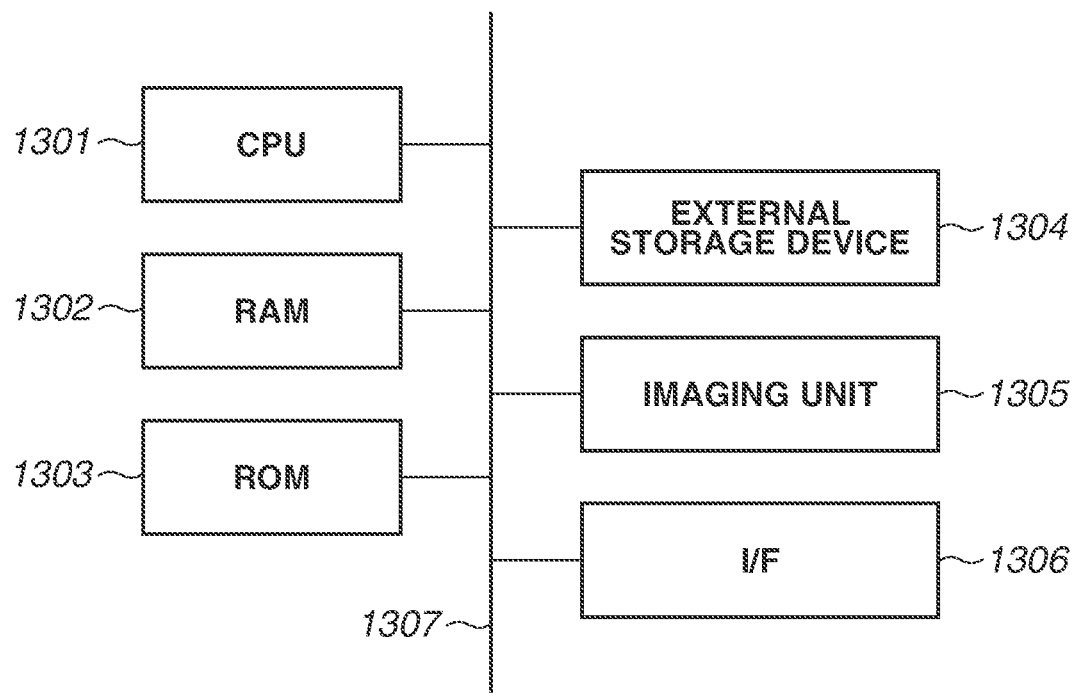
FIG. 13 is a block diagram illustrating a hardware configuration of the imaging apparatus according to any of the exemplary embodiments.

FIG. 13 is a block diagram illustrating an example of a hardware configuration of the imaging apparatus that executes the program to perform the processing according to any of the above-described exemplary embodiments.

A CPU 1301 controls the entire imaging apparatus using a computer program and data stored in a random access memory (RAM) 1302 or a read only memory (ROM) 1303, and also performs the processing according to any of the above-described exemplary embodiments. The CPU 1301 controls an imaging unit 1305.

The RAM 1302 includes an area for temporarily storing a computer program and data loaded from an external storage device 1304, data acquired from an external device via an interface (I/F) 1306, and the like. Furthermore, the RAM 1302 includes a work area used by the CPU 1301 to perform various kinds of processing. In other words, the RAM 1302 can be allocated as a frame memory or can provide various other areas as necessary.

The ROM 1303 stores therein setting data of the imaging apparatus, a boot program, and the like.

The imaging unit 1305 can include an image sensor such as a charge-coupled device (CCD) image sensor or a complementary metal-oxide semiconductor (CMOS) image sensor. The imaging unit 1305 generates the image signal by photoelectrically converting the subject image formed by an imaging optical system (not illustrated).

The external storage device 1304 is a Universal Serial Bus (USB) memory or a Secure Digital (SD) card, for example. The external storage device 1304 stores therein the computer program for causing the CPU 1301 to implement the processing according to any of the above-described exemplary embodiments. Furthermore, the external storage device 1304 may store therein each image as a processing target.

The computer program and the data stored in the external storage device 1304 are loaded as necessary into the RAM 1302 under control by the CPU 1301, and are to be processed by the CPU 1301. A network such as a local area network (LAN) or the Internet, and another device such as a projection device or a display device can be connected to the I/F 1306. In addition, the CPU 1301 can acquire and transmit various kinds of information via the I/F 1306. A bus 1307 connects the above-described units to one another.

While the exemplary embodiments of the present disclosure have been described above, the present disclosure is not limited to the exemplary embodiments and can be modified and changed in various manners within the scope of the gist thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-028593, filed Feb. 21, 2020, which is hereby incorporated by reference herein in its entirety.

What is claimed is:

1. An apparatus comprising:
   at least one processor; and
   a memory coupled to the at least one processor storing instructions that, when executed by the processor, cause the processor to function as:
   an imaging unit configured to capture an image with an exposure time determined for each pixel or for each area including a plurality of pixels;
   a detection unit configured to detect a moving object area from the captured image;
   a calculation unit configured to calculate a luminance of each of a plurality of the pixels or the areas that is included in the detected moving object area;
   a determination unit configured to determine, for each of the plurality of pixels or areas included in the moving object area, a different exposure time in a predetermined range based on the calculated luminance; and
   a controlling unit configured to read out a value relative to a pixel or area indicating a brightest luminance, in the calculated luminance of each of the plurality of the pixels or the areas,
   wherein the controlling unit is configured to correct the exposure time based on the read value is uccd to rccalculatc the cxpocurc timc so that the exposure time is reduced, and
   wherein the exposure time is reduced by a length corresponding to the read value.

2. The apparatus according to claim 1, wherein the determination unit determines, for each of the plurality of pixels or areas where the calculated luminance is lower than a threshold value, the exposure time in a first range and determines, for each of the plurality of pixels or areas where the calculated luminance is equal to or higher than the threshold value, the exposure time in a second range wider than the first range.

3. The apparatus according to claim 2, wherein the determination unit determines the same exposure time for each of the plurality of pixels or areas where the calculated luminance is lower than the threshold value.

4. The apparatus according to claim 2, further comprising a speed detection unit configured to detect a moving speed in the moving object area,
   wherein the determination unit determines an upper limit of the first range based on the detected moving speed.

5. The apparatus according to claim 1, wherein the determination unit determines, for each of a plurality of the pixels or the areas that is not included in the moving object area, the exposure time in a third range wider than a second range.

6. A method for controlling an apparatus including an imaging unit configured to capture an image with an exposure time determined for each pixel or for each area including a plurality of pixels, the method comprising:
   detecting a moving object area from the captured image;
   calculating a luminance of each of a plurality of the pixels or the areas that is included in the detected moving object area;
   determining, for each of the plurality of pixels or areas included in the moving object area, a different exposure time in a predetermined range based on the calculated luminance; and
   reading out a value relative to a pixel or area indicating a brightest luminance, in the calculated luminance of each of the plurality of the pixels or the areas;
   correcting the exposure time based on the read value so that the exposure time is reduced,
   wherein the exposure time is reduced by a length corresponding to the read value.

7. The method according to claim 6, wherein the exposure time in a first range is determined for each of the plurality of pixels or areas where the calculated luminance is lower than a threshold value, and the exposure time in a second range wider than the first range is determined for each of the plurality of pixels or areas where the calculated luminance is equal to or higher than the threshold value.

8. The method according to claim 7, wherein the same exposure time is determined for each of the plurality of pixels or areas where the calculated luminance is lower than the threshold value.

9. The method according to claim 7, further comprising detecting a moving speed in the moving object area,
wherein an upper limit of the first range is determined based on the detected moving speed.

10. The method according to claim 6, wherein the exposure time in a third range wider than a second range is determined for each of a plurality of the pixels or the areas that is not included in the moving object area.

11. A non-transitory computer-readable storage medium storing a program for causing a computer to execute a method for controlling an apparatus including an imaging unit configured to capture an image with an exposure time determined for each pixel or for each area including a plurality of pixels, the method comprising:
detecting a moving object area from the captured image;
calculating a luminance of each of a plurality of the pixels or the areas that is included in the detected moving object area;
determining, for each of the plurality of pixels or areas included in the moving object area, a different exposure time in a predetermined range based on the calculated luminance; and
reading out a value relative to a pixel or area indicating a brightest luminance, in the calculated luminance of each of the plurality of the pixels or the areas;
correcting the exposure time based on the read value so that the exposure time is reduced,
wherein the exposure time is reduced by a length corresponding to the read value.

12. The non-transitory computer-readable storage medium according to claim 11, wherein the exposure time in a first range is determined for each of the plurality of pixels or areas where the calculated luminance is lower than a threshold value, and the exposure time in a second range wider than the first range is determined for each of the plurality of pixels or areas where the calculated luminance is equal to or higher than the threshold value.

13. The non-transitory computer-readable storage medium according to claim 12, wherein the same exposure time is determined for each of the plurality of pixels or areas where the calculated luminance is lower than the threshold value.

14. The non-transitory computer-readable storage medium according to claim 12, further comprising detecting a moving speed in the moving object area,
wherein an upper limit of the first range is determined based on the detected moving speed.

15. The non-transitory computer-readable storage medium according to claim 11, wherein the exposure time in a third range wider than a second range is determined for each of a plurality of the pixels or the areas that is not included in the moving object area.

* * * * *